Feb. 25, 1964    M. GREEN    3,121,951
EATING UTENSILS
Filed Dec. 12, 1960
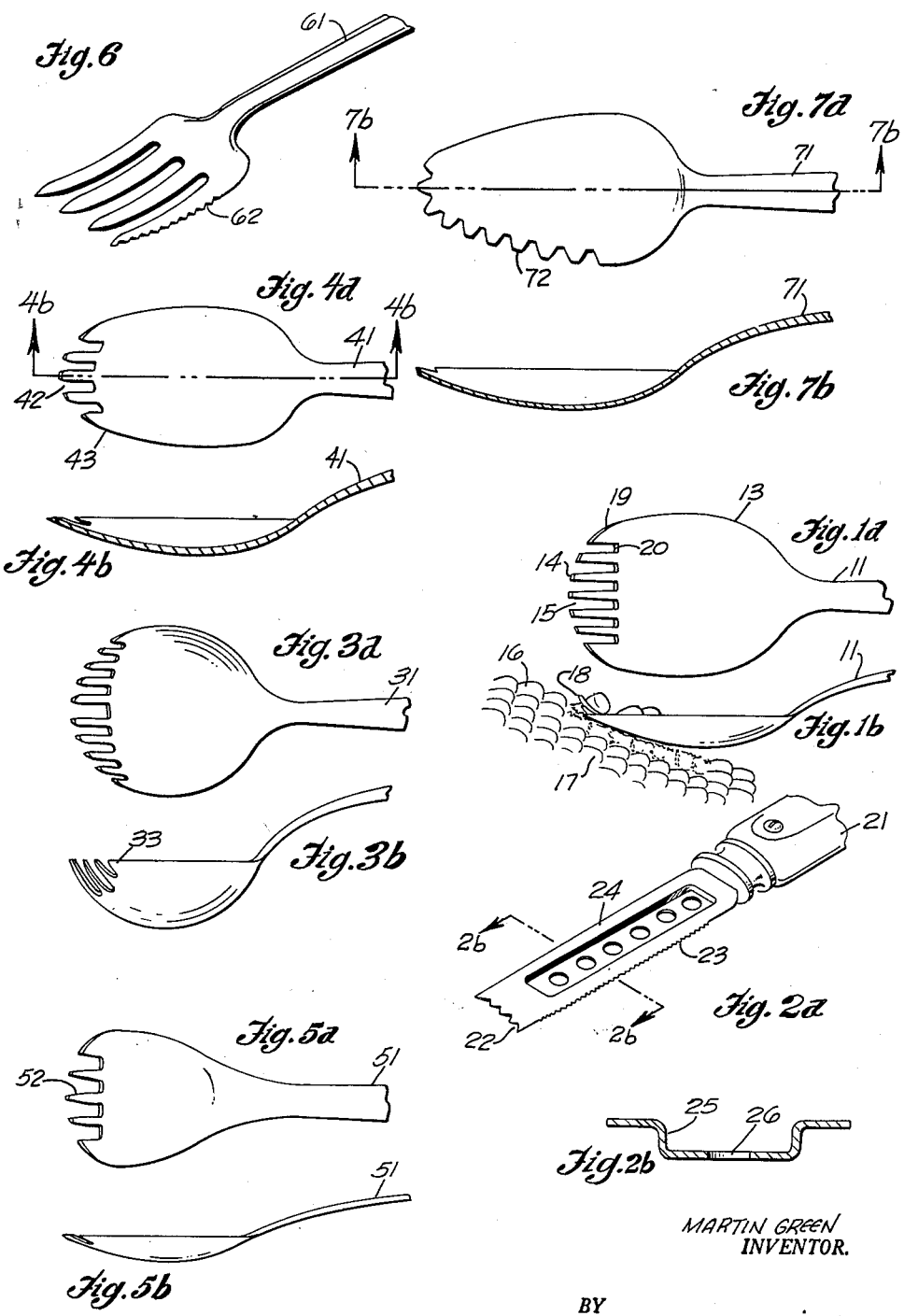
MARTIN GREEN
INVENTOR.
BY George B. Oujero
attorney

United States Patent Office 3,121,951
Patented Feb. 25, 1964

3,121,951
EATING UTENSILS
Martin Green, 155 Airmount Road, Mahwah, N.J.
Filed Dec. 12, 1960, Ser. No. 75,268
1 Claim. (Cl. 30—149)

The present invention relates to flatware and table utensils and more particularly to table utensils for persons with poor teeth or no teeth.

It is well known that many persons have difficulty in eating many foods because of poor teeth or because they have either no teeth or no front teeth. For such persons, it is almost impossible to eat such foods as corn where it is necessary to sink the teeth right into the food. Although dental plates are useful to some extent and more useful for some people than for others, it is still difficult for many persons wearing dental plates or false front teeth to eat certain foods such as fruit or corn.

It has now been discovered that a new type of table utensil can be provided useful in the eating of such foods as fruits and corn for people with bad, false, or no front teeth.

Thus, it is an object of the present invention to provide table utensils particularly useful to certain people in eating foods such as corn and fruit.

Another object of the present invention is to provide table utensils for people with bad, false or no front teeth.

Still another object of the present invention is to provide an eating utensil for people with bad, false or no front teeth which will fall within the general line or pattern of eating utensils customarily used so that the user will not feel embarrassed when using the utensil herein contemplated.

With the foregoing objects and other objects in view, the invention resides in the novel arrangement hereinafter described and claimed, it being understood that changes in the precise embodiment of the invention herein disclosed may be made within the scope of that which is claimed without departing from the spirit of the invention.

The invention will become apparent from the following description taken in conjunction with the accompanying drawing in which:

FIGURES 1a and 1b respectively show a top and longitudinal cross-sectional view of a spoon particularly adapted for the eating of corn;

FIGS. 2a and 2b respectively illustrate a perspective and lateral cross-sectional view of a knife used when eating corn;

FIGS. 3a and 3b are views similar to FIGS. 1a and 1b depicting a spoon particularly adapted for the eating of fruit;

FIGS. 4a and 4b are views similar to FIGS. 1a and 1b showing another spoon adapted for the eating of fruit;

FIGS. 5a and 5b are views similar to FIGS. 1a and 1b applying the invention herein contemplated to a child's spoon;

FIG. 6 illustrates an embodiment of a cake eating fork; and,

FIGS. 7a and 7b are views similar to FIGS. 1a and 1b of a spoon useful in eating citrus fruit such as grapefruit.

Generally speaking, the present invention contemplates a set of eating utensils including a knife member, spoon member, and fork member, each of said members having a set of teeth so disposed on said member as to facilitate the engagement by said member of a particular type of food so that not only is said member capable of and adapted to hold the food and carry it to the mouth, but, in addition, said member can sever the food more readily and in a more digestible manner from adjacent matter.

Referring now to the drawing, there is first shown a spoon 11 particularly useful for eating corn. This spoon besides having the usual handle and wide, oval hollow portion 13 has in addition thereto a set of teeth 14 at the front end of the spoon. The spacing 15 between teeth 14 is set so as to enable the teeth 14 to pass between the corn particles 16. Since the corn cob 17 is of cylindrical shape, the center teeth 18 are set higher than the outer teeth 19, in this way it is possible for the teeth to grab four rows of corn particles 16. To cut the particles from the corn cob, the spaces at the teeth base 20 are sharp so as to readily cut through the corn and grab the kernel.

As a complementary or additional utensil in eating corn there is also provided a knife 21. The design and pattern of the knife not only resembles that of the spoon for reasons of symmetry but also for reasons of utility. At the front of the knife are teeth 22. The teeth at the front of the knife differ somewhat from those of the spoon in that they are saw teeth rather than fork-type teeth. The teeth are also sharpened in saw-teeth fashion. Thus, the point of the teeth can be readily driven into a corn cob to hold it down while the corn cob is being worked on with the spoon 11. The two knife edges 23 are advantageously serrated to help in cutting, preferably, thinly serrated. Across the blade portion of the knife 24 is a shallow hollow 25 having perforations 26. When used on corn, the knife will soon be warmed by the corn. Butter can then be placed in hollow 25 and can be evenly spread on the corn through perforations 26.

To eat corn with spoon and knife 11 and 21, the corn is first gripped by knife 21 by inserting the saw teeth into one end of the corn. The spoon 11 is then placed at the other end and gradually moved across about four rows of corn particles longitudinally over the corn, gathering up transverse rows between the fork-type teeth and scooping the corn into the spoon portion of the utensil. In some cases it may be preferable to place knife 21 at about the center portion of the corn cob. By applying a slight see-saw motion to the spoon, the corn particles are lifted so that the entire particle including the kernel comes out and also all the corn juice is squeezed out and can be scooped into the spoon.

For eating fruit, a deep-dish spoon 31 is provided. This spoon differs somewhat from spoon 11 which is intended primarily for corn. Fruit spoon 31 has at least three fork-type center teeth and two end teeth 33. These teeth all lie on the same sphero-elliptical surface. Between each pair of neighboring teeth, the space at the teeth base may be sharpened so as to readily cut into the fruit. Spoon 31 can be used to eat melon, tomato, potato, peach, etc. After a little practice, the entire inside of the fruit can be eaten leaving only the outer skin. Although spoon 31 is shown in the drawing as a deep dish spoon, a shallow spoon may also be used.

Spoon 41 is similar to deep-dish spood 31 excepting that spoon 31 is more spherical in shape while spoon 41 is more elliptical. Spoon 31 is more useful in eating into foods like a tomato, whereas spood 41 is more useful in eating around pits such as peaches and prunes. Again, there are the fork-type center teeth 42 and end teeth 43.

To complete the set there is also provided a child or baby spoon 51 having front teeth 52. This spoon with front teeth may also be used as a fish eating utensil or an oyster eating utensil.

Certain foods which are eaten with a fork such as pie must also be cut. To facilitate the eating of such foods, there is provided a dessert fork 61 having the usual forkprongs which are rather broad and flat. In addition, one of the end teeth has an outer serrated edge 62. Serrated edge 62 has rather narrow teeth fairly spaced apart and these teeth can be used to saw through a piece of fruit pie, pie-a-la-mode, or similar type of dessert.

For eating other fruits or desserts, there is provided a grapefruit spoon 71. This is similar to the usual shallow spoon except that extending about half-way around the outer eliptical edge of the spoon there is a serrated edge 72, the teeth of this serrated edge are preferably longer and wider than the teeth of dessert fork 61. With grapefruit spoon 71, it is possible to cut around a grapefruit just using the serrated edge 72.

It is to be observed therefore that the present invention provides for a set of flatware or eating utensils characterized in that each member of the set does more than merely grasp or hold the food. It can also cut, or partially cut food.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claim.

What is claimed is:

An eating utensil generally shaped like a spoon comprising in combination;

a handle;

an oval shaped broad hollow bowl portion supported by said handle;

a set of teeth at the front end of said oval shaped hollow bowl portion, there being at least three center teeth and two end teeth on each side, said end teeth being disposed outwardly as an extension of and in line with the oval shaped curve of said oval shaped bowl, said center teeth being disposed upwardly from the oval shaped surface of said bowl to conform to the cylindrical shape of a corn cob, the base for said teeth on said bowl between said teeth being sharp and so set as to enable said teeth to pass between corn kernels, the tips and edges of said teeth being sharpened so as to more readily pass under the corn kernel and remove it from the corn cob.

References Cited in the file of this patent

UNITED STATES PATENTS

| | | |
|---|---|---|
| 406,735 | Huckins | July 9, 1889 |
| 669,884 | Stoddard | Mar. 12, 1901 |
| 868,583 | Schuyler | Oct. 15, 1907 |
| 880,166 | Ruggles | Feb. 25, 1908 |
| 904,553 | McCoy | Nov. 24, 1909 |
| 1,827,780 | Chambers | Oct. 20, 1931 |
| 2,320,994 | Wright | June 8, 1943 |
| 2,555,735 | Estabrooks | June 5, 1951 |
| 2,637,104 | Samson | May 5, 1953 |
| 2,647,310 | Yolles | Aug. 4, 1953 |
| 2,778,109 | Haynes | Jan. 22, 1957 |
| 2,810,957 | Nelson | Oct. 29, 1957 |
| 2,825,968 | Baer | Mar. 11, 1958 |

FOREIGN PATENTS

| | | |
|---|---|---|
| 428,837 | Great Britain | May 20, 1935 |
| 652,764 | Great Britain | May 2, 1951 |